United States Patent
Hardesty et al.

(10) Patent No.: US 11,619,118 B2
(45) Date of Patent: Apr. 4, 2023

(54) INTEGRATED WIRING GUN AND METHOD

(71) Applicant: GEODynamics, Inc., Millsap, TX (US)

(72) Inventors: John Thomas Hardesty, Weatherford, TX (US); Terrell Saltarelli, Weatherford, TX (US); David S. Wesson, Fort Worth, TX (US)

(73) Assignee: GEODYNAMICS, INC., Millsap, TX (US)

( * ) Notice: Subject to any disclaimer, the term of this patent is extended or adjusted under 35 U.S.C. 154(b) by 736 days.

(21) Appl. No.: 16/107,075

(22) Filed: Aug. 21, 2018

(65) Prior Publication Data

US 2019/0085664 A1 Mar. 21, 2019

Related U.S. Application Data (60) Provisional application No. 62/559,332, filed on Sep. 15, 2017.

(51) Int. Cl.
*E21B 43/116* (2006.01)
*E21B 43/119* (2006.01)
(Continued)

(52) U.S. Cl.
CPC ............ *E21B 43/116* (2013.01); *E21B 43/11* (2013.01); *E21B 43/119* (2013.01); *E21B 43/1185* (2013.01); *F16B 2/04* (2013.01)

(58) Field of Classification Search
CPC .......... F16B 7/04; F16B 7/0413; F16B 7/042; F16B 7/22; F16B 12/26; F16B 2/04;
(Continued)

(56) References Cited

U.S. PATENT DOCUMENTS 4,063,334 A * 12/1977 Rohman ............... F16L 3/1233
 24/619
4,220,808 A * 9/1980 Fujita ..................... H02B 1/048
 174/490

(Continued)

FOREIGN PATENT DOCUMENTS

CA 2521825 A1 * 3/2007 ............ E21B 43/116
GB 1394457 A 5/1975

OTHER PUBLICATIONS

Partial Supplementary European Search Report for corresponding/related European Application No. 18856294.6, dated May 28, 2021.
(Continued)

*Primary Examiner* — Jonathan P Masinick
(74) *Attorney, Agent, or Firm* — Morgan, Lewis & Bockius LLP (57) ABSTRACT

An improved perforating gun with novel endplates is disclosed along with a corresponding method of assembly. The endplate includes a base with a first end separated from a second end separated by a curved sidewall centered around a longitudinal axis and a set of tube tabs flexibly coupled to the base and extending from the second end. Each of the set of tube tabs has a retaining lip and is generally oriented in a direction of the longitudinal axis. The endplate may include an optional carrier tab with an integrated alignment pin. Selected embodiments may also include a zero-tension connector with a sliding contact mounted within a cavity of a housing, a through-wire connected to the sliding contact. The novel endplate reduces the cost and complexity of manufacture and installation.

8 Claims, 9 Drawing Sheets

(51) Int. Cl.
 *E21B 43/11* (2006.01)
 *E21B 43/1185* (2006.01)
 *F16B 2/04* (2006.01)

(58) Field of Classification Search
 CPC .... F16B 2/20; F16B 2/22; F16B 21/06; F16B 21/08; F16B 21/086; F16B 2200/20; E21B 43/116; E21B 43/117; E21B 43/119
 See application file for complete search history.

(56) References Cited

U.S. PATENT DOCUMENTS

| | | | |
|---|---|---|---|
| 4,834,429 A * | 5/1989 | Miller | A47K 10/04 220/788 |
| 4,967,048 A | 10/1990 | Langston | |
| 5,358,418 A | 10/1994 | Carmichael | |
| 6,116,807 A * | 9/2000 | Dzurko | F16C 33/20 403/165 |
| 6,851,471 B2 | 2/2005 | Barlow et al. | |
| 6,957,968 B1 | 10/2005 | Gretz | |
| 7,708,489 B2 | 5/2010 | Trotter et al. | |
| 7,862,090 B1 | 1/2011 | Foreman | |
| 8,875,787 B2 | 11/2014 | Tassaroli | |
| 8,943,943 B2 | 2/2015 | Tassaroli | |
| 9,441,465 B2 | 9/2016 | Tassaroli | |
| 10,174,595 B2 * | 1/2019 | Knight | E21B 43/1185 |
| 10,865,922 B2 * | 12/2020 | Corbett | F16L 37/091 |
| 2008/0284163 A1 | 11/2008 | Proulx et al. | |
| 2013/0043074 A1 | 2/2013 | Tassaroli | |
| 2015/0145243 A1 | 5/2015 | Dude | |
| 2015/0321800 A1 | 11/2015 | Viale et al. | |

OTHER PUBLICATIONS

International Search Report and Written Opinion in International Application No. PCT/US18/47592 dated Jan. 2, 2019. (All references not cited herewith have been previously made of record.
Extended European Search Report in corresponding/related European Application No. 18856294.6 dated Aug. 30, 2021.

* cited by examiner

INTEGRATED WIRING GUN AND METHOD

CROSS-REFERENCE TO RELATED APPLICATION(S)

This application claims the benefit of provisional U.S. Application No. 62/559,332 entitled "Integrated Wiring Gun and Method" filed Sep. 15, 2017, the entirety of which is incorporated herein in its entirety.

BACKGROUND

Technical Field

Novel aspects described herein relate generally to perforating guns that are used in the oil and gas industry to explosively perforate underground hydrocarbon bearing formations. More particularly, the present disclosure describes a perforating gun with improved endplates and an optional zero-tension connector that provides an integrated wiring solution for perforating guns which are easier to manufacture, install, and operate.

Background

A perforating gun is often needed to extract oil and gas from underground formations. The perforating gun is lowered into a casing positioned in a wellbore to a desired rock layer and then fired, creating holes through the casing and into the targeted rock. These perforating holes connect the rock holding the oil and gas to the wellbore, allowing for inflow of hydrocarbons. In many instances, a series of cascaded perforating guns, called a gun string assembly, is used. Each of the perforating guns in the gun string assembly is connected to another perforating gun by a tandem. The tandem houses a detonation transfer apparatus that causes detonation of an adjacent gun in the gun string assembly. Detonation can be initiated from the wireline via electrical, electronic, or pressure-based means.

Gun string assemblies often include numerous components, some of which are formed from costly and complex manufacturing processes. As a result, installation of gun string assemblies is often a complex and time-consuming endeavor. In addition, perforating guns typically lack an integrated wiring solutions, which results in different wireline operators implementing one of a number of conventional, but unreliable methodologies. Therefore, what is needed is an improved perforating gun addressing at least the foregoing deficiencies.

SUMMARY OF THE INVENTION

Novel aspects of the present invention are directed to a novel perforating gun, components thereof, and method of assembly. Accordingly, in a first embodiment, novel aspects disclosed herein relate to an improved endplate comprising a base with a first end separated from a second end separated by a curved sidewall centered around a longitudinal axis. A set of tube tabs, which is flexibly coupled to the base, extends from the second end. Each of the set of tube tabs is generally oriented in a direction of the longitudinal axis. Further, each of the set of tube tabs comprises a retaining lip for securing the endplate to a charge carrier.

In a second embodiment, novel aspects disclosed herein relate to a zero-tension connector having a housing with a first end separated from a second end by a sidewall. A sliding contact is slidably mounted within a cavity of the housing. The sliding contact has a body with a distal end opposite a proximal end, and a portion of the distal end is exposed at the first end of the housing. A through-wire coupled to the proximal end of the sliding contact.

In a third embodiment, novel aspects disclosed herein relate to a perforating gun comprising a charge carrier having a first end and a second end separated by a curved sidewall centered around a longitudinal axis. The charge carrier further comprises a first set of tube tab receivers at the first end and a second set of tube tab receivers at the second end, and a first endplate releasably coupled to the first end of the charge carrier. The first endplate comprises a first set of flexible tube tabs releasably coupled to the first set of tube tab receivers. The charge carrier also comprises a second endplate releasably coupled to the second end of the charge carrier. The second endplate comprises a second set of flexible tube tabs releasably coupled to the second set of tube tab receivers. The charge carrier is mounted within a gun carrier tube by a set of carrier tabs extending radially outward from an outer surface of the second endplate.

In a fourth embodiment, novel aspects disclosed herein relate to a method of assembling the perforating gun comprising a set of novel endplates and a zero-tension connector, the method including the steps of attaching a first endplate to a first end of a charge carrier, wherein the first endplate comprises a first set of tube tabs; attaching a second endplate to a second end of the charge carrier, wherein the second endplate comprises a second set of tube tabs and a set of carrier tabs extending radially outwardly from an outer surface of the second endplate; and sliding the charge carrier into a gun carrier until the set of carrier tabs mates with set of carrier tab receivers on an internal surface of the gun carrier.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

Novel aspects of the disclosure recognize certain deficiencies in the prior art. For example, a gun string assembly positioned in a wellbore casing with a wireline cable includes a conducting through-wire that provides the electrical connection between a perforating gun and an adjacent tandem. The through-wire is extended down a length of the perforating gun, out the end and then wired directly to the output pin of a firing switch in the tandem. Tension must be maintained on the through-wire to gather up the slack and prevent the through-wire from being pinched between the threads of the perforating gun and the tandem as the two pieces are joined. Oftentimes, too much tension is applied to the through-wire, causing it to disconnect from the output pin of the firing switch. As a result, wireline operators often solder the through-wire to the output pin and apply an optional wrapping of silicone or heat-shrink.

As will be discussed in more detail below, novel aspects of an improved endplate and the perforating gun assembly provide for a zero-tension connector for establishing the electrical connection without the need for the time-consuming wiring steps. In addition, when an improved uphole endplate is outfitted with a zero-tension connector, the firing switch of the attached tandem is protected from inadvertent damage. For context, in conventional systems the firing switch in the tandem is exposed the shaped charges housed in the charge carrier. When the charges are detonated, the firing switch is exposed to shrapnel and overpressure conditions. In contrast, in one illustrative embodiment described herein, an improved perforating gun includes an uphole endplate with a zero-tension connector that seals the uphole end of the perforating gun and shields the firing switch.

Another deficiency in the prior art is the variability in the methodology in which wireline operators ground gun string assemblies. The variability is attributable to a lack of an integrated grounding solution in perforating guns. One example of a conventionally utilized grounding solution involves scratching through an oxide layer on the surface of a firing switch and affixing the ground wire to the exposed surface. In some instances, the ground wire may be dislodged by vibration and shock during installation or detonation of the gun string assembly. In contrast, novel aspects of the improved perforating gun disclosed herein includes an endplate with an integrated grounding solution that eliminates variability and also simplifies the grounding process.

Additionally, current methods of assembling a gun string assembly require an excessive number of steps that lengthen the assembly procedure. For example, affixing conventional endplates to a charge carrier requires alignment of apertures in the endplate with corresponding apertures in the charge carrier, then joining the two pieces with screws. To align the shaped charges in the charge carrier with the scallops in the gun carrier, an ancillary operation is often required to insert a pin from the charge carrier through a corresponding aperture in the endplate. Further, after the charge carrier is properly oriented within the gun barrel, one or more snap rings are introduced into the gun barrel to engage an annular snap ring recess, which maintains the axial position of charge carrier so that the shaped charges in the charge carrier are properly aligned with the scallops on the outer surface of the gun barrel. Snap ring use increases the number of installation steps as well as the overall cost of the system. As will be discussed in more detail, certain aspects of the disclosure provides for novel perforating gun components with reduced manufacturing costs, reduced number of components, and a reduced number of installation steps.

Figure 1:
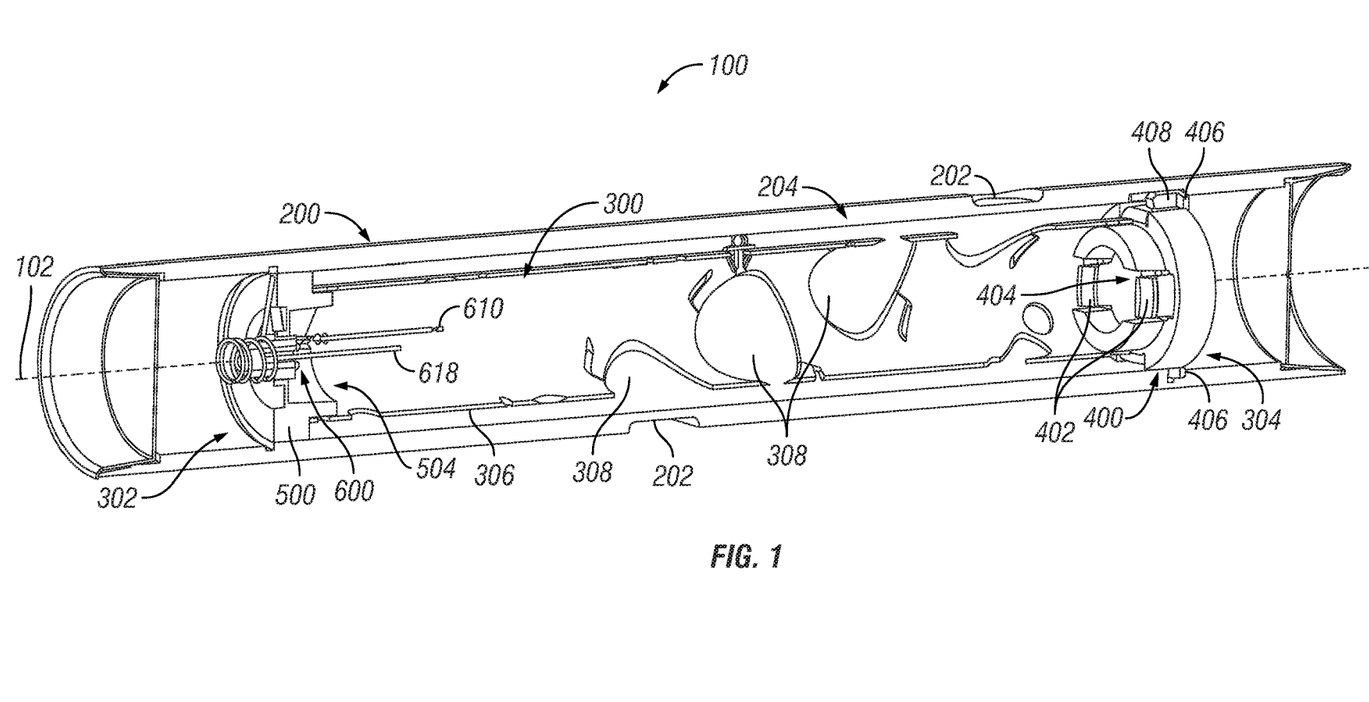
FIG. 1 is a perspective view of a perforating gun in accordance with an illustrative embodiment.

FIG. 1 is a perspective view of a perforating gun in accordance with an illustrative embodiment. Perforating gun 100, which is shown in partial cross-section to more clearly depict the interconnection between individual components, is a generally cylindrical apparatus that includes a hollow gun carrier 200 centered around axis 102. A plurality of scallops 202 is disposed throughout the outer sidewall 204 of the gun carrier. Each of the plurality of scallops 202 is a thin-walled portion of the sidewall 204 aligned with a shaped charge housed within. Specifically, a charge carrier 300 is mounted concentrically within the gun carrier 200 which houses shaped charges (not shown). The charge carrier 300 is a hollow, cylindrical frame having a first end 302 separated from a second end 304 by an inner sidewall 306. A plurality of gun ports 308 disposed throughout the inner sidewall 306 and arranged in a pattern to coincide with the plurality of scallops 202 in the gun carrier 200.

The charge carrier 300 is sealed on either end by endplates 400 and 500. As used herein, the first endplate 500 may be referred to in the alternative as the uphole endplate, and the second endplate 400 may be referred to in the alternative as the downhole endplate. In one embodiment, the first endplate 500 and the second endplate 400 are molded components formed by injection molding or direct molding from a composite. The endplates 400 and 500 may also be formed from pure Nylon, glass-filled Nylon, plastic, thermoset polymer, thermoplastic polymer, zinc die cast, steel, composite, magnesium, aluminum, or combinations thereof. Generally, molded components are easier and cheaper to manufacture; however, in another embodiment, the first endplate 500 and the second endplate 400 can be 3D printed or machined from metal. Thus, in some preferred embodiments each of the endplates 400 and 500 are formed as unitary components that are not formed of smaller subcomponents that are later attached via permanent, semi-permanent, or removable means.

The second endplate 400 has a set of tube tabs 402 configured to releasably couple the second endplate 400 with the charge carrier 300. As used herein, the term "set of" means one or more. Thus, the set of tube tabs 402 can be one tube tab, two tube tabs, or more. In one embodiment, each of the set of tube tabs 402 engages a corresponding tube tab receiver 310 integrated into the inner sidewall 306 of the charge carrier 300. Where the set of tube tabs 402 is two or more tube tabs, the set of tube tabs 402 are arranged asymmetrically around the circumference of the aperture 404 that extends through the second endplate 400. Likewise, the set of tube tab receivers 310 in the second end 304 of the charge carrier 300 is also arranged in a corresponding asymmetric pattern. The asymmetric arrangement of the set of tube tabs 402 and the corresponding arrangement of the tube tab receivers 310 ensures that the second endplate 400 is properly aligned within the charge carrier 300. For example, if the set of tube tabs 402 is two tube tabs, placing each of the two tube tabs 180° apart from each other, on opposite sides of the aperture 404 allows the second endplate 400 to be installed in two separate ways, 180° out of phase. However, placing the two tube tabs at opposite ends of an arc having an angle of less than 180° eliminates variability in the installation process. Proper alignment of the endplates 400 and 500 with the charge carrier 300 along with the proper alignment of the endplates 400 and 500 with the gun carrier 200 necessarily aligns the shaped charges in the charge carrier 300 with the plurality of scallops 202 in the gun carrier 200.

The second endplate 400 also includes a set of carrier tabs 406 for releasably coupling the second endplate 400 with the gun carrier 200. In one embodiment, each of the set of carrier tabs 406 engages a carrier tab receiver 206 the interior surface of the gun carrier 200 to maintain the axial position of the charge carrier 300 within the gun carrier 200. In this illustrative embodiment, the carrier tab receiver 206 is an annular recess conventionally used for engaging a snap ring. Thus, the gun carrier 200 may still be used with legacy endplates secured with a snap ring.

To maintain the proper orientation of the second endplate 400 within the gun carrier 200, and thus align the shaped charges and corresponding gun port 308 with a scallop 202, one or more of the carrier tabs 406 includes an alignment pin 408. Each of the one or more alignment pins 408 corresponds to an alignment pin receiver 208 in the interior surface of the gun carrier 200, which can be seen in more detail in FIG. 2. In an exemplary embodiment, the alignment pin 408 is an elongated body integrally formed with the second endplate 400, and aligned with the longitudinal axis 102 of the perforating gun 100. The alignment pin receiver 208 is one or more elongated recesses sized to receive the one or more alignment pins 408. In the event that two or more alignment pins 408 are implemented, the two or more alignment pins 408 should be asymmetrically oriented around the second endplate 400 to prevent improper alignment of the charge carrier 300 within the gun carrier 200. In the depicted embodiment, only one of the carrier tabs 406 is formed with an alignment pin 408.

Figure 5:
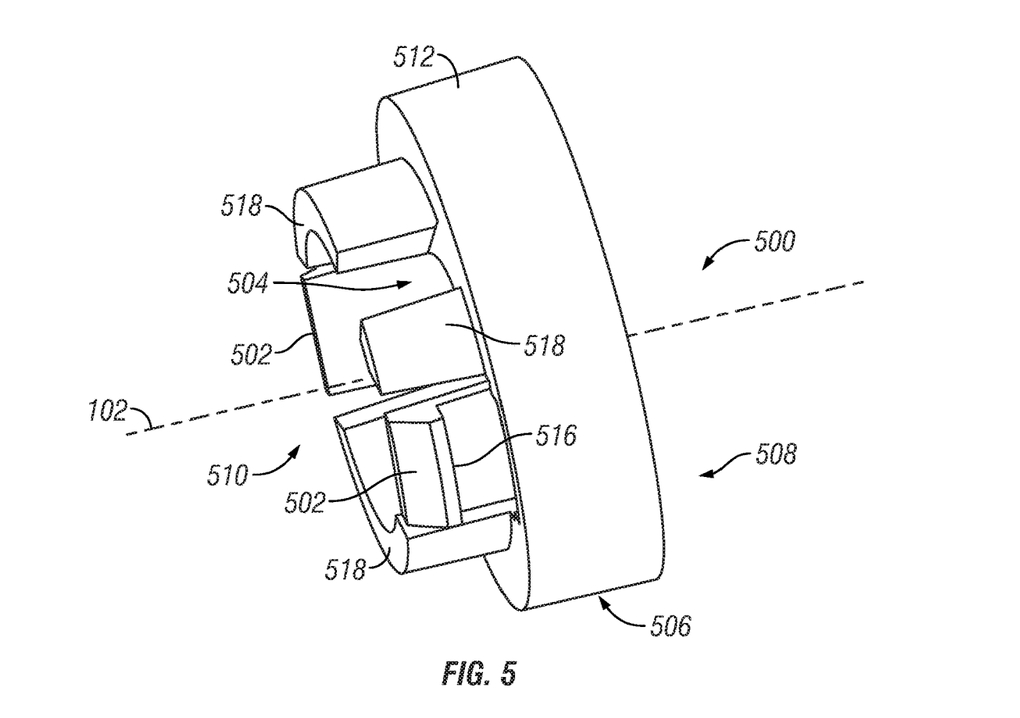
FIG. 5 is a perspective view of an uphole endplate in accordance with an illustrative embodiment.

A first endplate 500 is releasably coupled to the first end 302 of the charge carrier 300 by a set of tube tabs 502 (omitted for clarity but shown in more detail in FIG. 5). Each of the set of tube tabs 502 engages one corresponding tube tab receiver 310 integrated into the sidewall of the charge carrier 300. In an embodiment, where the set of tube tabs 502 is two or more tube tabs, the set of tube tabs 502 are arranged asymmetrically around the circumference of the corresponding aperture 504 in first endplate 500. Likewise, the set of tube tab receivers 310 in the first end 302 of the charge carrier 300 is also arranged in a corresponding asymmetric pattern to maintain the proper orientation of the first endplate 500 relative to the charge carrier 300. The asymmetric arrangement of the set of tube tabs 502 ensures that the first endplate 500 is properly aligned in the first end 302 of the charge carrier 300. As already mentioned, proper orientation of the endplates 400 and 500 relative to the charge carrier 300 results in proper alignment of the shaped charges mounted within the charge carrier 300 with the gun ports 308 and also the scallops 202, which is desirable for optimum recovery of oil and gas.

In a non-limiting embodiment, a zero-tension connector 600 is optionally installed into the first endplate 500 to simplify the electrical connections in the perforating gun 100, to reduce the number of steps required for installing a gun string assembly, and to protect the firing switch in upstream tandems (not shown). In particular, the zero-tension connector 600 eliminates the need to maintain tension on a through-wire 618 during installation, obviating the myriad of steps currently undertaken to secure the through-wire 618 to the output pin of the firing switch. In addition, the zero-tension connector 600 also provides a convenient means for grounding the tandem (not shown) to the gun carrier 200 and the ground wire 604. The zero-tension connector 600 is described in more detail in FIG. 6.

Figure 2:
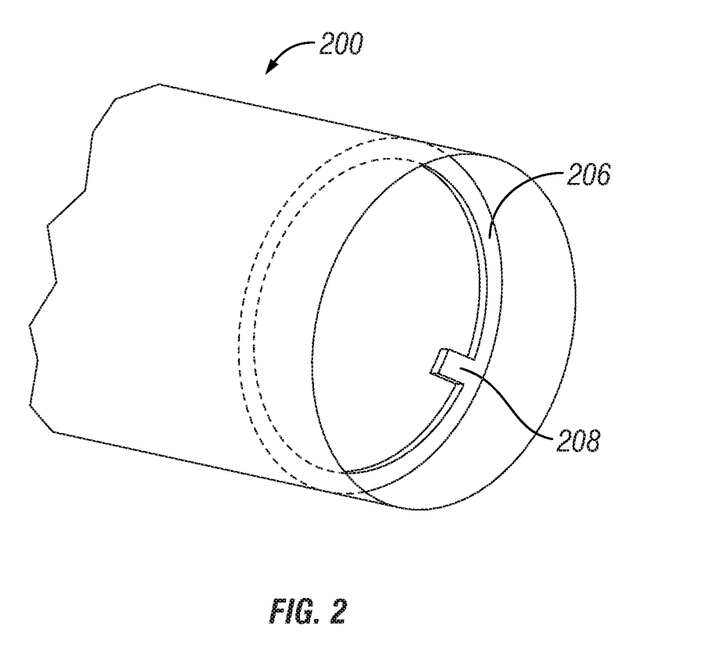
FIG. 2 is an end view of a gun carrier according to an illustrative embodiment.

FIG. 2 is an end view of a gun carrier according to an illustrative embodiment. Located at the end of the gun carrier 200 is a carrier tab receiver 206, which is depicted as an annular recess configured to mate with the set of carrier tabs 406 on the second endplate 400. To properly align the second endplate 400 with the gun carrier 200, the gun carrier also includes a set of alignment tab receivers 208. In the depicted embodiment, the set of alignment tab receivers 208 is a single elongated recess extending from the set of carrier tab receivers 206. During installation, the endplates 400 and 500 are attached to opposing ends of the charge carrier 300, and then the charge carrier 300 is then inserted axially into the gun carrier 200 along the axis 102 to allow the set of carrier tabs 406 of the second endplate 400 to mate with the set of carrier tab receivers 206. While inside the gun carrier 200, the charge carrier 200 may be rotated until the alignment pin 408 engages the alignment pin receiver 208, which aligns the shaped charges, gun ports 308, and scallops 202 as previously mentioned.

Figure 3:
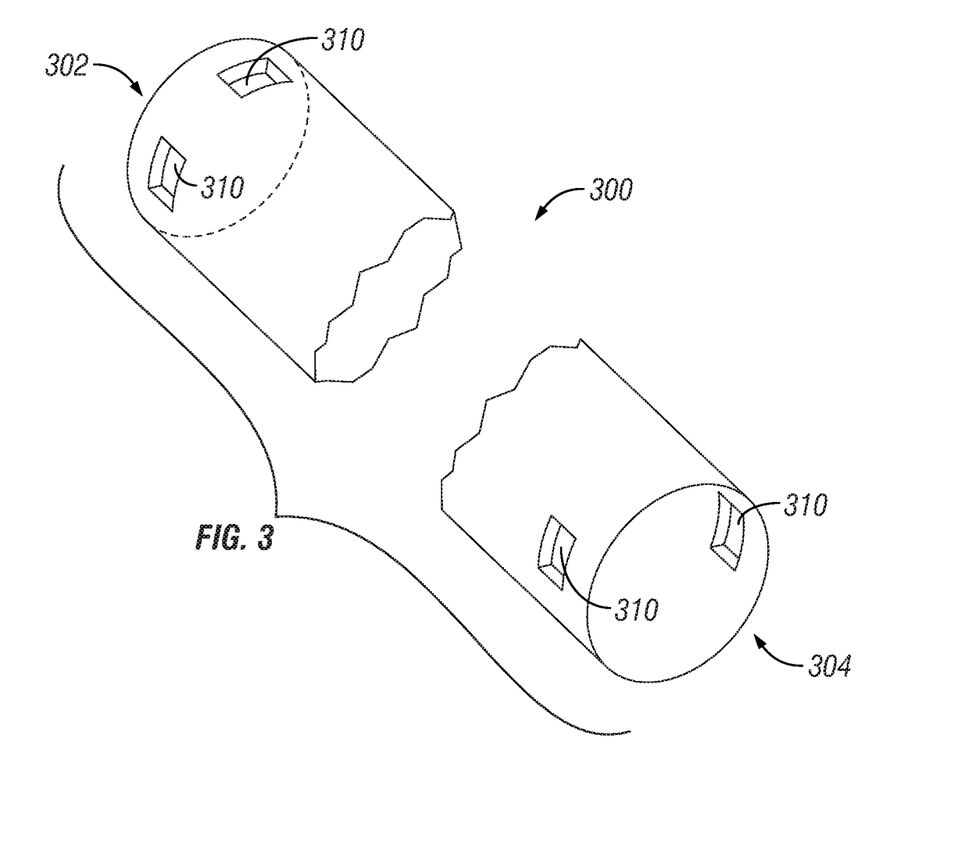
FIG. 3 is a perspective view of a charge carrier according to an illustrative embodiment.

FIG. 3 is a perspective view of a charge carrier according to an illustrative embodiment. The charge carrier 300 includes a set of tube tab receivers 310 at each end which is configured to receive a set of tube tabs from a corresponding endplate. For example, the set of tube tab receivers 310 at the first end 302 of the charge carrier 300 are configured to receive the tube tabs 502 from endplate 500, and the set of tube tab receivers 310 at the second end 304 of the charge carrier 300 are configured to receive the tube tabs 402 from endplate 400.

The set of tube tab receivers 310 depicted in FIG. 3 are in the form of apertures extending through the sidewall 306 of the charge carrier 300. Each of the set of tube tab receivers 310 are shaped to engage the operative surface a corresponding tube tab, which is a retaining lip in the depicted embodiments. Further, each of the set of tube tab receivers 310 are positioned to align with the asymmetrically positioned tube tabs so that corresponding endplates will be installed with the proper alignment. In the depicted embodiment, the set of tube tab receivers 310 at the first end 302 of the charge carrier 300 are positioned around the charge carrier 300 with a different pattern than the set of tube tabs 310 at the second end 304, which prevents an endplate from being inadvertently installed at the wrong end of the charge carrier 300.

Although the set of tube tab receivers 310 are depicted as apertures, in another embodiment the set of tube tab receivers 310 may be recesses that extend only partially through the sidewall 306. In yet another embodiment, the set of tube tab receivers 310 are projections that extend outwardly from the sidewall 306 of the charge carrier.

Figure 4:
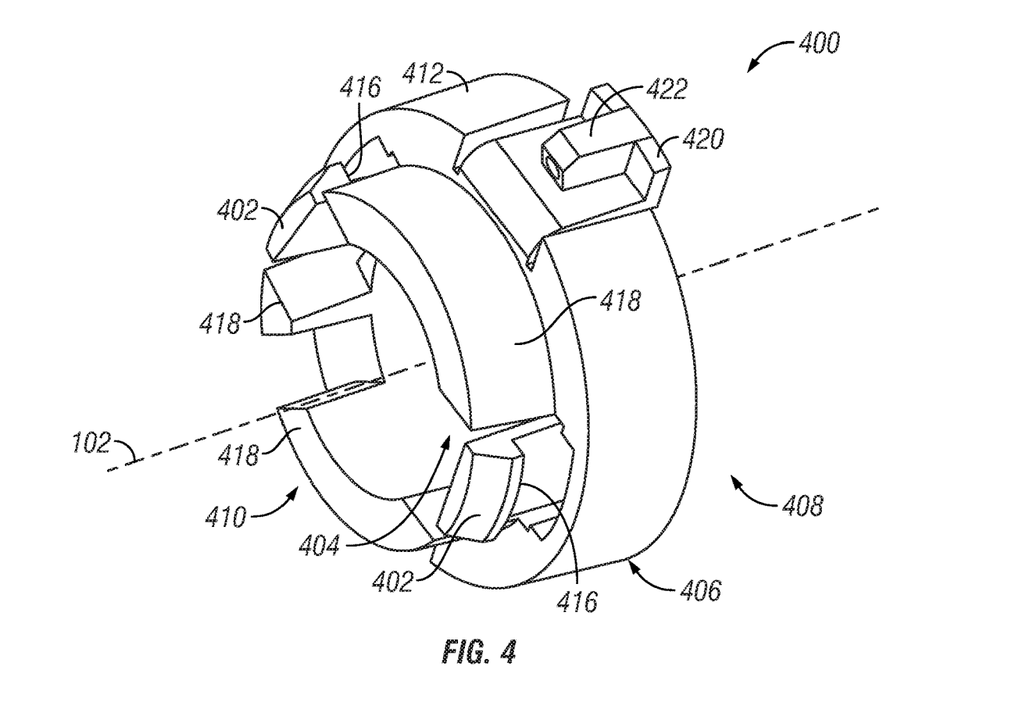
FIG. 4 is a perspective view of a downhole endplate in accordance with an illustrative embodiment.

FIG. 4 is a perspective view of a downhole endplate in accordance with an illustrative embodiment. The second endplate 400 includes a base 406 with a first end 408 separated from a second end 410 by a curved sidewall 412 centered around a longitudinal axis 102. The second endplate 400 also includes a set of tube tabs 402 flexibly coupled to the base 406, extending from the second end 410. Each of the set of tube tabs 402 is arranged around an aperture 404 in the second end 410 of the base 406 and generally oriented in a direction of the longitudinal axis 102. Additionally, each of the set of tube tabs 402 includes a retaining lip 416, which is an operative surface of a tube tab 402 configured to engage a tube tab receiver 310.

The second endplate 400 includes a set of structural supports 418 fixedly coupled to the base 406 at the second end 410, and projects generally in the direction of the longitudinal axis 102. In this illustrative embodiment in FIG. 2, the set of structural supports 418 is a plurality of curved sidewalls arranged around an aperture 404 at the second end 410 of the base 406. The set of structural supports 418 is a projection that protects the tube tabs 402 from breakage. For example, before installation, in the absence of the set of structural supports 418, the tube tabs 402 would extend from the second end 410 of the base 406 unprotected, prone to unintended breakage if dropped or improperly packaged prior to shipment. Thus, in the depicted embodiment, the set of tube tabs are interspersed between the set of structural supports 418.

Additionally, when the set of structural supports 418 is a plurality of curved sidewalk are arranged around the aperture 404, each of the plurality of structural supports 418 has a thickness such that the plurality of structural supports 418 can be snugly inserted into an end of a charge carrier 300. In this embodiment, the plurality of structural supports 418 reinforces the connection between the charge carrier 300 and the first endplate 200 and assumes the forces that would otherwise be asserted on the relatively weaker tube tabs 402.

The second endplate 400 also includes a set of carrier tabs 406. The set of carrier tabs 406 is one or more fastening devices for securing the second endplate 400 and the attached charge carrier 300 to the gun carrier 200. The set of carrier tabs 406 is partially recessed into the curved sidewall 412 of the base 406 with a flange 420 projecting radially outward relative to the curved sidewall 412. Each of the set of carrier tabs 406 is flexibly coupled to the base 406 to allow the flange 420 to flex relative to the base 406. In the depicted embodiment, each of the set of carrier tabs 406 is an L-shaped fastener. During installation, as the charge carrier 300 is inserted into the gun carrier 200, the set of carrier tabs 406 flexes radially inward until each of the set of flanges 420 mates with a carrier tab receiver 206 to secure the second endplate 400 in the gun carrier 200. As previously mentioned, at least one of the set of carrier tabs 406 includes an alignment pin 422, which is configured to align the charge carrier 300 in the gun carrier 200.

FIG. 5 is a perspective view of an uphole endplate in accordance with an illustrative embodiment. The first endplate 500 includes a base 506 with a first end 508 separated from a second end 510 by a curved sidewall 512 centered around a longitudinal axis 102. The first endplate 500 also includes a set of tube tabs 502 flexibly coupled to the base 506. In addition each of the set of tube tabs 502 is arranged around an aperture 504 in the second end 510 of the base 506 and generally oriented in a direction of the longitudinal axis 102. Additionally, each of the set of tube tabs 502 includes a retaining lip 516.

The second endplate 500 includes a set of structural supports 518 fixedly coupled to the base 506, which extends from the second end 510 of the base 506. Each of the set of structural supports 518 is generally oriented along the longitudinal axis 102. In this illustrative embodiment in FIG. 5, the set of structural supports 518 is a plurality of curved sidewalls arranged around an aperture 504 at the second end 510 of the base 506. The set of structural supports 518 is a projection that protects the tube tabs 502 from breakage. Thus, in the depicted embodiment, the set of tube tabs are interspersed between the set of structural supports 518.

Additionally, when the set of structural supports 518 is a plurality of curved sidewalls are arranged around the aperture 504, each of the plurality of structural supports 518 has a thickness such that the plurality of structural supports 518 can be snugly inserted into an end of a charge carrier 300. In this embodiment, the plurality of structural supports 518 reinforces the connection between the charge carrier 300 and the first endplate 500 and relieves the forces that would be otherwise asserted on the relatively weaker tube tabs 502.

Figure 6:
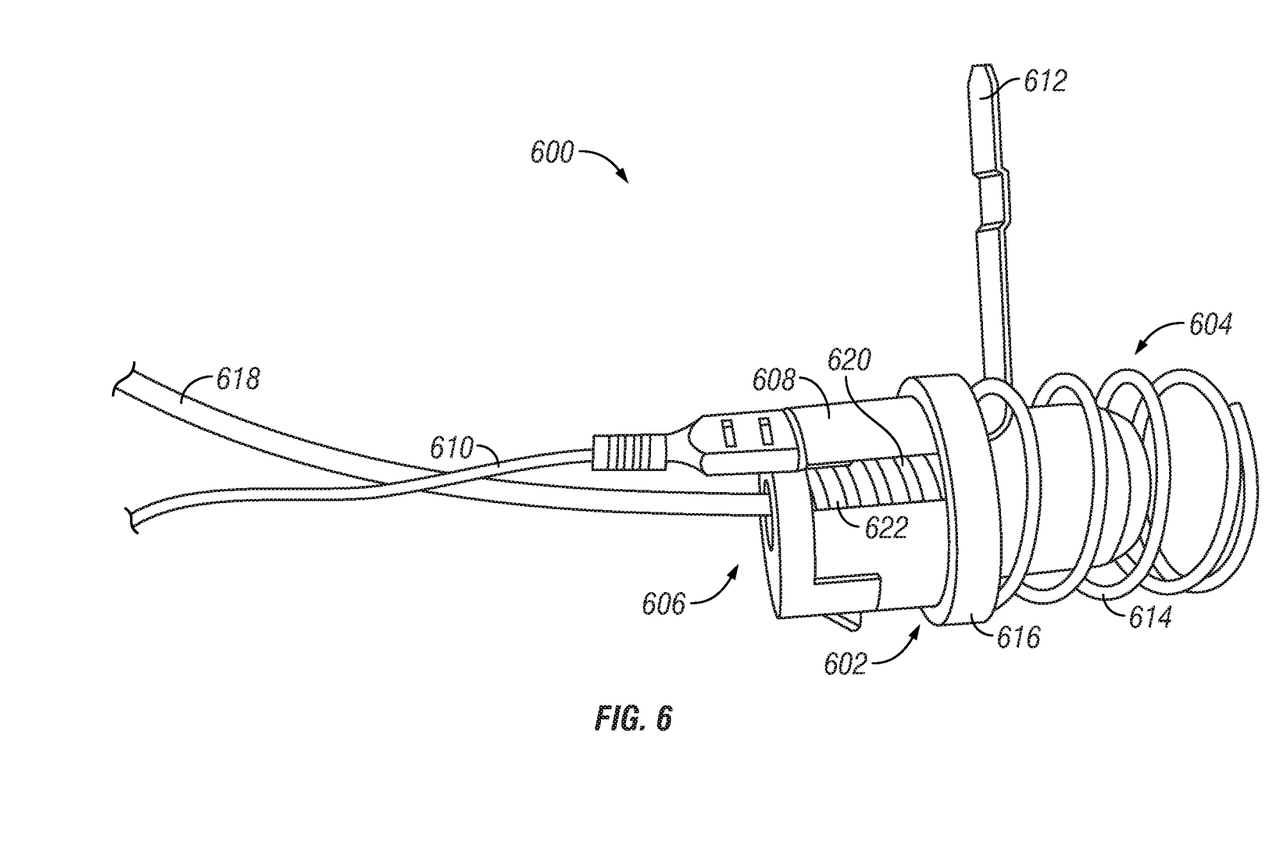
FIG. 6 is a perspective view of a zero-tension connector in accordance with an illustrative embodiment.

FIG. 6 is a perspective view of a zero-tension connector in accordance with an illustrative embodiment. Zero-tension connector 600 is generally formed from a housing 602 that has a first end 604 and a second end 606 separated by a sidewall 608. The sidewall 608 defines a cavity that houses a sliding contact 622, both of which are shown in more detail in the exploded view depicted in FIG. 5. In addition, extending from the second end 606 of the housing 602 is a ground wire 610 that is removably attached to a proximal end of a first ground connection 612. In the depicted embodiment, the first ground connection 612 is an elongated metallic tab that is secured with the housing 602 by passing the first ground connection 612 through a slotted aperture in the sidewall 608 of the housing 602. However, this method of securing should be deemed exemplary and non-limiting.

The first ground connection 612 is electrically connected to a second ground connection, which is a coiled spring in this embodiment. In particular, the first ground connection 612 is wrapped partially around a coil and optionally secured by the application of solder or other form of conducting weld. Where the second ground connection 614 is a coiled spring, the second ground connection 614 encircles the first end 604 of the housing 602 and one end is positioned against an annular flange 616 encircling the outer surface of the sidewall 608. The other end of the second ground connection 614 extends outwardly beyond the first end 604. When the zero-tension connector 600 is installed into a first endplate that is subsequently incorporated into a perforating gun, the first ground connection 612 grounds the gun carrier with the ground wire 610. When the perforating gun is attached to a tandem, the second ground connection 614 is compressed by a retaining nut in the tandem, which grounds the tandem to ground wire 610. The ground wire 610 extends the length of its corresponding perforating gun and connects to a detonator block, which may be connected on its other end to another zero-tension connector affixed to an endplate of a downhole perforating gun. As a result every gun in a string will have a positive, engineered, and redundant ground, which eliminates the common practice for wireline companies to engineer their own grounding solution as perforating guns are loaded.

Also extending from the second end 606 of the housing 602 is a through-wire 618. The through-wire 618 is connected to a proximal end of a sliding contact 622, which is shown in more detail in FIG. 5. A distal end of the sliding contact 622 is exposed at the first end 604 of the housing 602 to make contact with an output pin of a firing switch to obviate the need to manually wrap the through-wire around the firing switch and then secure the connection with solder and/or tubing. A spring 620 is mounted within the cavity of the housing 602 and disposed between the proximal end of the sliding contact 622 and the housing 602. The spring 620 maintains the sliding contact at the first end 604 of the housing with the proximal end exposed and positioned to receive the output pin of a firing switch (not shown).

Figure 7:
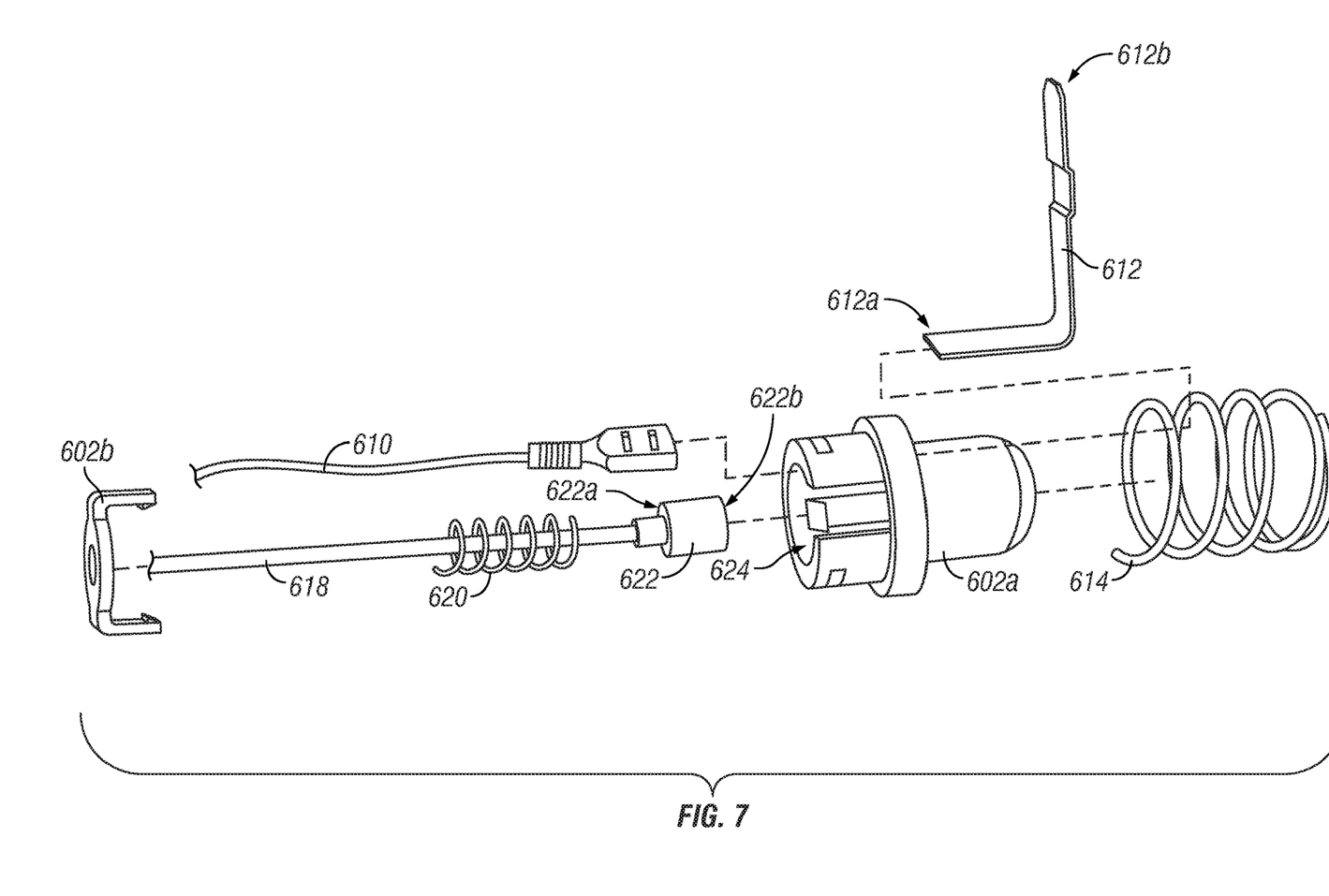
FIG. 7 is an exploded view of a zero-tension connector in accordance with an illustrative embodiment.

FIG. 7 is an exploded view of a zero-tension connector in accordance with an illustrative embodiment. The housing 602 of the zero-tension connector 600 is depicted as a plurality of pieces that, when assembled, defines a cavity to house sliding contact 622. In particular, the housing is formed from a body 602a that defines cavity 624, which may be sealed by endcap 602b. The endcap 602b may be secured to the body 602a using conventionally available fasteners. For example, in one embodiment the endcap 602b may be threaded and configured to be screwed to the body 602, which is counter-threaded. In this illustrative embodiment, the endcap 602b includes a set of flexible arms, each with a protruding lip configured to engage a corresponding recess in the sidewall 608 of the body 602a.

The sliding contact 622 is housed within the cavity 624. The sliding contact includes a proximal end 622a opposite to a distal end 622b. In this illustrative embodiment, the through-wire 618 is electrically connected to the proximal end 622a of the sliding contact 622 with the through-wire 618 extending out from an aperture in the endcap 602b. The spring 620 is oriented along the through-wire 618 and positioned so that the spring 620 is compressible between the proximal end 622a of the sliding contact 622 and the interior surface of the endcap 602b. As previously mentioned, the spring 620 provides a compressive force that maintains the sliding contact 622 at the first end 604 of the housing 602 to receive an output pin of a firing switch, as can be seen in more detail in FIG. 9.

The first ground connection 612 is depicted as a metallic tab with a proximal end 612a and a distal end 612b. In this illustrative embodiment, the first ground connection 612 is wrapped at least partially around a coil in the second ground connection 614 and optionally soldered together to maintain the electrical connection. In an alternate embodiment, the first ground connection 612 and the second ground connection 614 may be a single, integrated component that simplifies installation and obviates the need for a soldered joint.

The first ground connection 612 is secured with the housing 602 via an aperture sized to frictionally engage the first ground connection 612. In another embodiment, a bracket or other conventional fastening means may be implemented. Once secured with the housing, the proximal end 612a of the first ground connection 612 is coupled to the ground wire 610.

Figure 8:
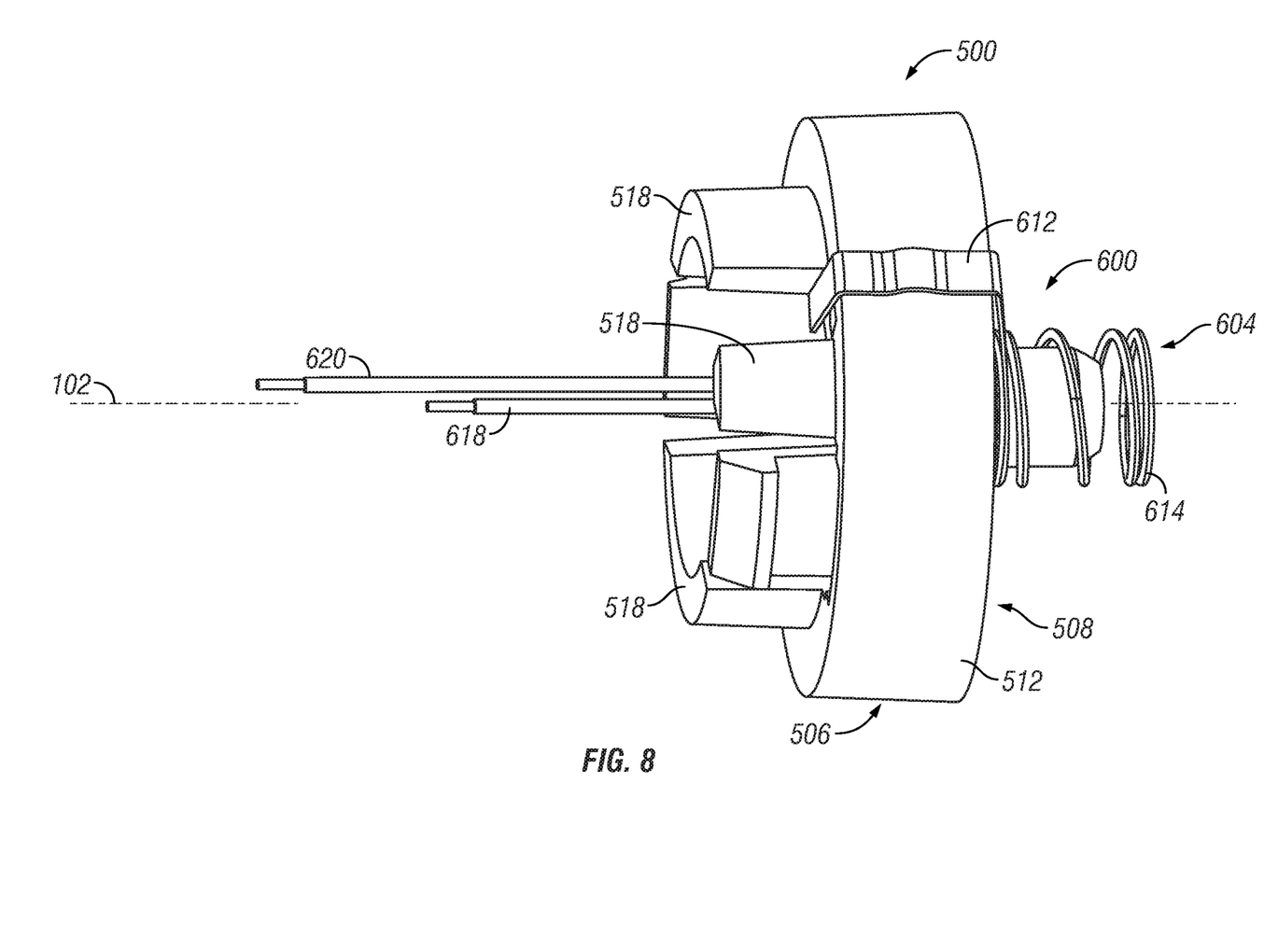
FIG. 8 is a perspective view of a zero-tension connector coupled to an uphole endplate in accordance with an illustrative embodiment.

FIG. 8 is a perspective view of a zero-tension connector coupled to an uphole endplate in accordance with an illustrative embodiment. The zero-tension connector 600 is aligned with the longitudinal axis 102 and extended at least partially through the base 506 of the first endplate 500. In the depicted embodiment, the zero-tension connector 600 is mounted with its first end 604 projecting outwardly from the first end 508 of the base 506. The second end 606 of the zero-tension connector 600 is obscured in this figure by the curved sidewall 512 and the set of structural supports 518, but can be seen in more detail in FIG. 9.

In a non-limiting embodiment, the first ground connection 612 is wrapped at least partially around the base 506 of the first endplate 500 so that installation of the endplate 500 with a charge carrier 300 causes the rim of the charge carrier 300 to compress the distal end 612b of the second ground connection 612 against the base 506 of the first endplate 500 to prevent inadvertent misalignment or disengagement during installation or operation.

Figure 9:
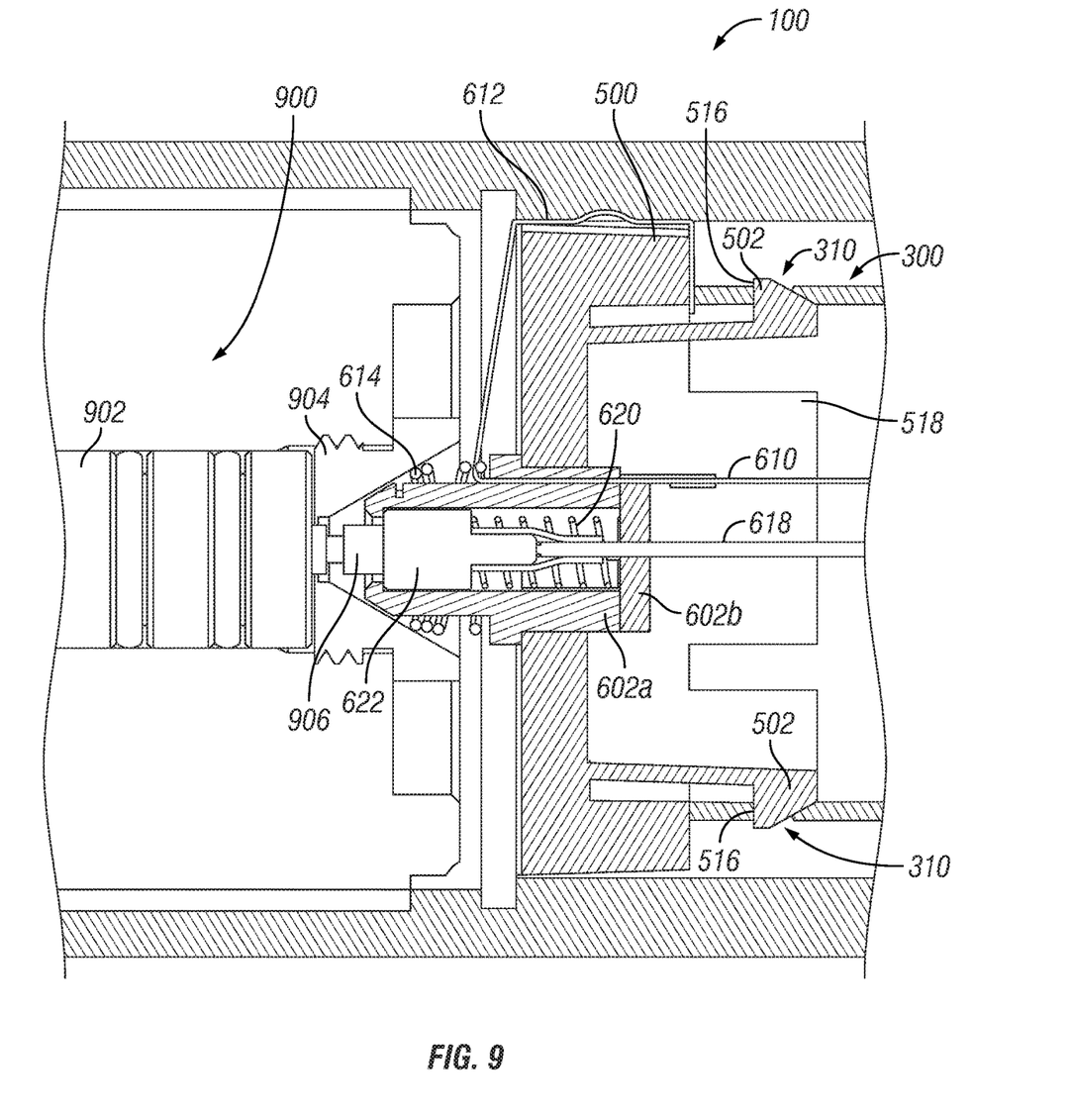
FIG. 9 is a cross-sectional view of a portion of a gun string assembly in accordance with an illustrative embodiment.

FIG. 9 is a cross-sectional view of a portion of a gun string assembly in accordance with an illustrative embodiment. An uphole end of a perforating gun 100 is shown connected to a tandem 900. The tandem 900 includes a switch body 902 secured in place by a retaining nut 904. Projecting outwardly from the switch body 902 is the output pin 906, which is configured to form an electrical connection with a through-wire 618 of the attached perforating gun 100. When the perforating gun 100 is attached to the tandem 900, the output pin 906 engages the distal end 622b of the sliding contact 622 that is exposed at the first end 604 of the zero-tension connector 600. Contact between the output pin 906 and the sliding contact 622 is maintained by the force exerted by the spring 620, which is able to absorb and dissipate the vibration and shock generated during operation to prevent inadvertent disengagement.

The perforating gun 100 is grounded with a firing switch 902 in the tandem 900 by the second ground connection 614, which is compressed against the retaining nut 904 of the tandem 900 when the perforating gun 100 is attached to the tandem 900. In this illustrative embodiment, the second ground connection 614 is electrically connected to the grounding wire 610 by way of the first ground connection 612 that is coupled directly to the ground wire 610. The first ground connection 612, which is shown wrapped partially around a coil of the second ground connection 614, also grounds the gun carrier 200 to the ground wire 612. When the charge carrier 300 and the endplates 400 and 500 are assembled and inserted into the gun carrier 200, a portion of the first ground connection 612 is secured between the inner surface of the gun carrier 200 and the first endplate 400. Thus the gun carrier 200 and the firing switch 902 is grounded with the ground wire 610.

In another embodiment, the switch 902 can be configured with its own dedicated ground wire to provide a redundant ground, which can be crucial to proper operation given that tandems are frequently reused and in the absence of through cleaning, deposits on the tandems may prevent a good ground connection. The dedicated ground wire can be attached to the switch 902 by conventional means, such as soldering or other forms conducting welds, and placed at a location that does not interfere with installation of the switch into the tandem 900. Thus, in one embodiment, the dedicated ground wire is attached to an end portion of the switch 902 opposite from the output pin 906.

Figure 10:
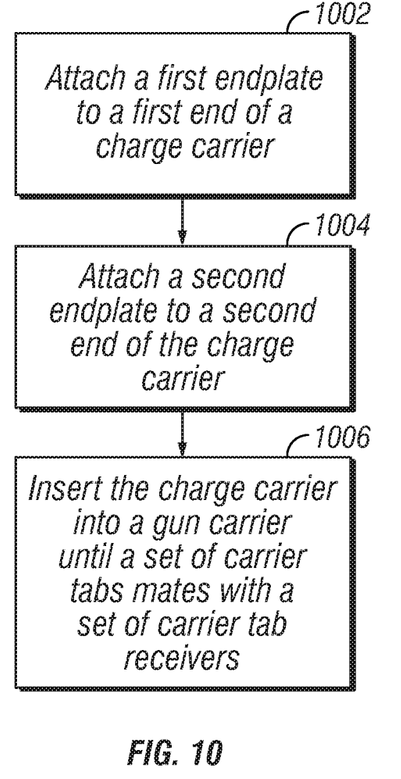
FIG. 10 is a high level flowchart of an exemplary method of assembling a perforating gun in accordance with an illustrative embodiment.

FIG. 10 is a high level flowchart of an exemplary method of assembling a perforating gun in accordance with an illustrative embodiment. A first endplate having a first set of tube tabs is attached to a first end of a charge carrier (Step 1002). A second endplate, which has a second set of tube tabs and a set of carrier tabs extending radially outwardly from an outer surface of the second endplate, is attached to a second end of the charge carrier (Step 1004). The charge carrier and the attached endplates are slidably inserted into a gun carrier until the set of carrier tabs mates with set of carrier tab receivers on an internal surface of the gun carrier (Step 1006).

Figure 11:
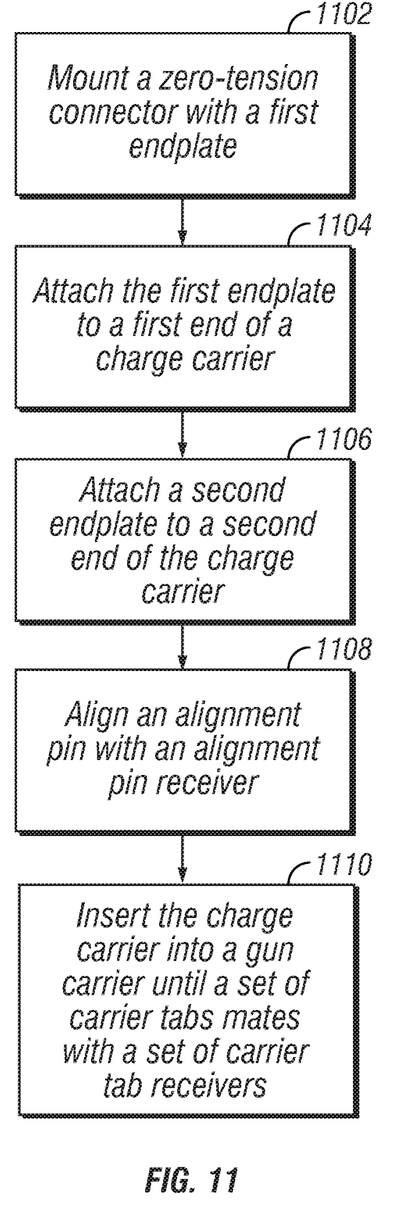
FIG. 11 is a flowchart of a particular method of assembling a perforating gun in accordance with an illustrative embodiment.

FIG. 11 is a flowchart of a particular method of assembling a perforating gun in accordance with an illustrative embodiment. A zero-tension connector is mounted to a first endplate (Step 1102). The first endplate, which has a first set of tube tabs, is attached to a first end of a charge carrier (Step 1104). In one embodiment, Step 1104 includes the additional steps of orienting the first set of tube tabs with a corresponding tube tab receiver in a first end of the charge carrier, and then sliding a second end of the first endplate into the first end of the charge carrier until the first set of tube tabs mates with the first set of tube tab receivers.

A second endplate, which has a second set of tube tabs and a set of carrier tabs extending radially outwardly from an outer surface of the second endplate, is attached to a second end of the charge carrier (Step 1106). Step 1106 can also include the additional steps of orienting the second set of tube tabs with a corresponding tube tab receiver in a second end of the charge carrier, and then sliding a second end of the second endplate into the second end of the charge carrier until the second set of tube tabs mates with the second set of tube tab receivers One or more alignment pins integrated with the set of carrier tabs is aligned with a corresponding alignment pin receiver positioned on an interior surface of the gun carrier (Step 1108). Alignment of the one or more alignment pins with the corresponding alignment pin receiver aligns shaped charges in the charge carrier with a corresponding scallop on an exterior of the gun carrier.

The charge carrier and the attached endplates are slidably inserted into a gun carrier until the set of carrier tabs mates with set of carrier tab receivers on an internal surface of the gun carrier (Step 1110). In one embodiment, the set of carrier tab receivers is an annular recess. In conventional perforating guns, the annular recess is configured to receive a snap ring to secure the charge carrier within the gun carrier.

Figure 12:
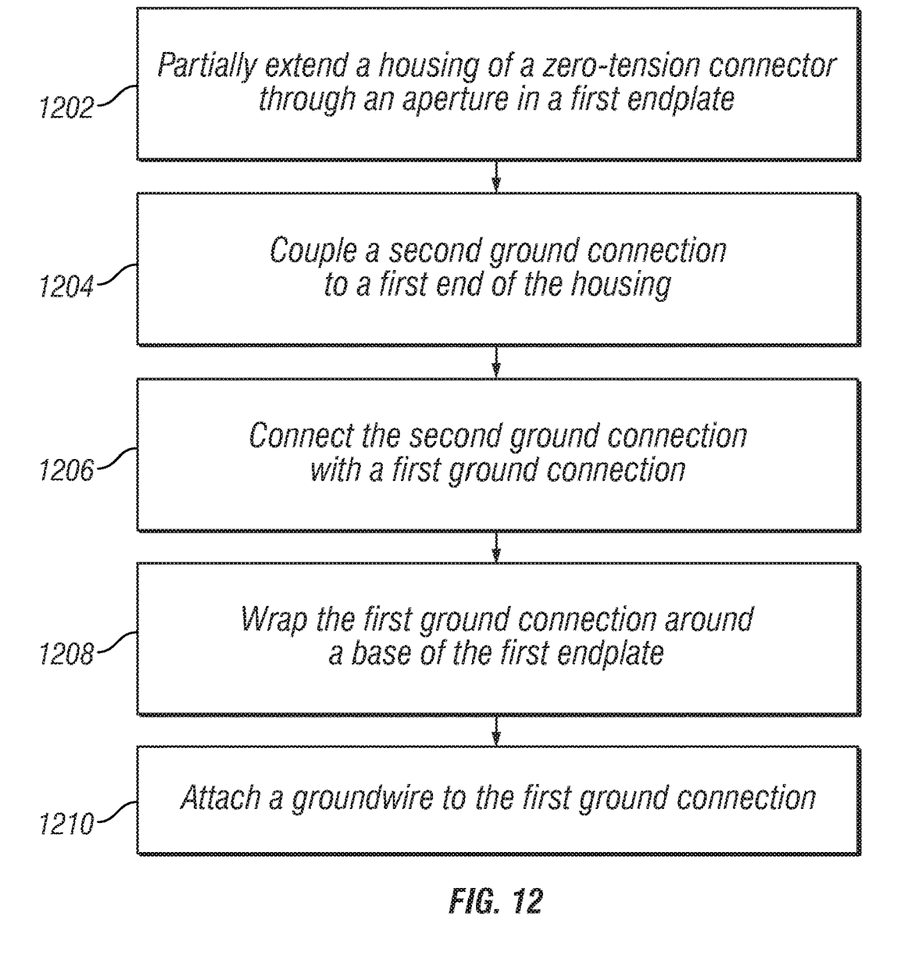
FIG. 12 is a flowchart of a particular method of installing a zero-tension connector into a first endplate in accordance with an illustrative embodiment.

FIG. 12 is a flowchart of a particular method of installing a zero-tension connector into a first endplate in accordance with an illustrative embodiment. A housing of the zero-tension connector is extended at least partially through an aperture in the first end of the first endplate (Step 1202). A second ground connection is coupled to at least a first end of the housing of the zero-tension connector (Step 1204). In a non-limiting embodiment, a portion of the second ground connection extends out beyond the first end of the housing, and the second ground connection is a coiled spring. The second ground connection is electrically connected with a first ground connection (Step 1206). In one embodiment, the first ground connection is an elongated metallic tab. A distal end of the first ground connection is wrapped at least partially around a base of the first endplate (Step 1208). A ground wire is attached to a proximal end of the first ground connection (Step 1210).

Figure 13:
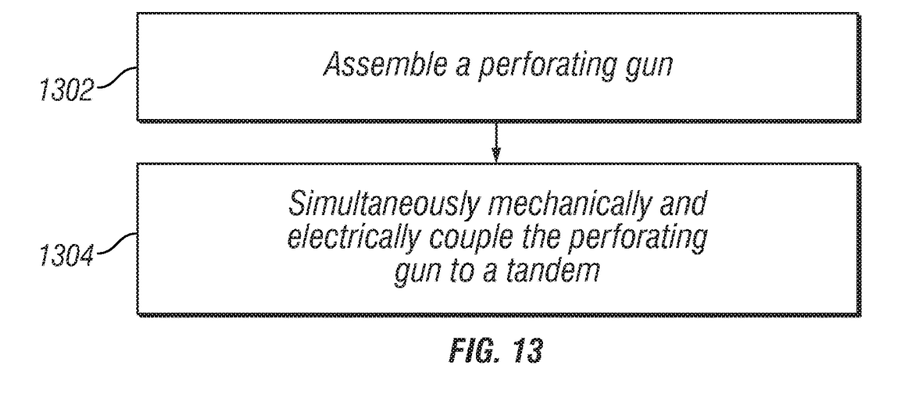
FIG. 13 is a flowchart of a method for partially assembling a gun string in accordance with an illustrative embodiment.

FIG. 13 is a flowchart of a method for partially assembling a gun string in accordance with an illustrative embodiment. A perforating gun is assembled (Step 1302). In one embodiment, the perforating gun can be assembled according to the steps of the method described in FIG. 8. In another embodiment, the perforating gun can be assembled according to the steps of the method described in FIG. 9 and FIG. 10. The perforating gun is simultaneously mechanically and electrically coupled to a tandem (Step 1304). The zero-tension connector installed into the first endplate includes a sliding contact that engages a corresponding output pin of a firing switch of a tandem when the perforating gun is attached to the tandem. In one particular embodiment, screwing together the first end of the perforating gun with a tandem causes the sliding contact in the zero-tension connector to engage with the output pin, which results in the simultaneous mechanical and electrical coupling of the perforating gun and the tandem.

ADDITIONAL EMBODIMENTS

The following paragraphs are offered as further description of various embodiments of the disclosed invention.

In a first embodiment, novel aspects of the present disclosure describe a novel endplate for use in oil and gas drilling operations, and in a particular application the endplate is usable in a perforating gun. The endplate comprises a base with a first end separated from a second end separated by a curved sidewall centered around a longitudinal axis; and a set of tube tabs flexibly coupled to the base and extending from the second end, wherein each of the set of tube tabs is generally oriented in a direction of the longitudinal axis, and wherein each of the set of tube tabs comprises a retaining lip.

In another aspect of the first embodiment, the endplate comprises a base with a first end separated from a second end separated by a curved sidewall centered around a longitudinal axis; and a set of tube tabs flexibly coupled to the base and extending from the second end, wherein each of the set of tube tabs is generally oriented in a direction of the longitudinal axis, and wherein each of the set of tube tabs comprises a retaining lip; and one or more limitations selected from the following list:

wherein the base is generally annular;

wherein the endplate further comprises a set of structural supports fixedly coupled to the base and extending from the second end, wherein the set of structural supports is generally oriented in the direction of the longitudinal axis;

wherein the set of structural supports is a plurality of curved sidewalls arranged around an aperture at the second end of the base;

wherein the set of tube tabs are interspersed between the plurality of structural supports;

wherein the plurality of structural supports and the set of tube tabs have substantially equal lengths;

wherein the set of tube tabs and the plurality of structural supports is arranged around an aperture in the second end of the base;

wherein the set of tube tabs comprises at least two tube tabs, and wherein each of the tube tabs is arranged around an aperture in the second end of the base;

wherein the set of tube tabs are asymmetrically disposed around an aperture at the second end of the base;

wherein the endplate further comprises a set of carrier tabs recessed into the curved sidewall, wherein each of the set of carrier tabs comprises a flange projecting radially outward relative to the curved sidewall;

wherein at least one of the set of carrier tabs comprises an alignment pin;

wherein each of the set of carrier tabs is an L-shaped tab;

wherein each of the set of carrier tabs is flexibly coupled to the base to allow the flange to flex relative to the base;

wherein the endplate is integrally formed;

wherein the endplate is formed from plastic, degradable, thermoset, thermoplastic, zinc die cast, steel, composite, magnesium, aluminum, injection mold, and polymer;

wherein a thickness of the base ranges from 0.06-4 inches; and wherein the endplate is a unitary component.

In a second embodiment, novel aspects of the present disclosure describe a novel zero-tension connector for use in oil and gas drilling operations, and in a particular application the zero-tension connector provides an integrated wiring solution in a perforating gun. The zero-tension connector comprises a housing with a first end separated from a second end by a sidewall; a sliding contact slidably mounted within a cavity of the housing, wherein the sliding contact has a body with a distal end opposite a proximal end, wherein a portion of the distal end is exposed at the first end of the housing; and a through-wire coupled to the proximal end of the sliding contact.

In another aspect of the second embodiment, the zero-tension connector comprises a housing with a first end separated from a second end by a sidewall; a sliding contact slidably mounted within a cavity of the housing, wherein the sliding contact has a body with a distal end opposite a proximal end, wherein a portion of the distal end is exposed at the first end of the housing; and a through-wire coupled to the proximal end of the sliding contact; and one or more limitations selected from the following list:

wherein the through-wire extends out of the housing from the second end;

wherein the zero-tension connector further comprises a spring located within the cavity of the housing, wherein the spring is positioned between the proximal end of the sliding contact and the second end of the housing;

wherein the portion of the distal end of the sliding contact exposed at the first end of the housing is sized to receive a terminal end of a firing switch;

wherein the zero-tension connector further comprises a first ground connection for a gun carrier; a second ground connection for a tandem; and wherein the first ground connection and the second ground connection are both electrically connected to the ground wire;

wherein the zero-tension connector further comprises an annular flange encircling the housing; and wherein the second ground connection is a spring encircling the first end of the housing abutting the annular flange, and wherein the second ground connection extends beyond the first end of the housing;

wherein the first ground connection is an elongated tab mounted to the housing and electrically coupled to the second ground connection;

wherein the zero-tension connector further comprises a groundwire detachably connected to a distal end of the second ground connection; and wherein the zero-tension connector is configured to establish an electrical ground between a perforating gun and a tandem, wherein the electrical ground passes from the zero-tension connector to a retaining nut in the tandem and then to a switch body in the tandem.

In a third embodiment, novel aspects of the present disclosure describe a novel perforating gun for use in oil and gas drilling operations. The perforating gun comprises a charge carrier having a first end and a second end separated by a curved sidewall centered around a longitudinal axis, wherein the charge carrier further comprises a first set of tube tab receivers at the first end and a second set of tube tab receivers at the second end; a first endplate releasably coupled to the first end of the charge carrier, wherein the first endplate comprises a first set of flexible tube tabs releasably coupled to the first set of tube tab receivers; a second endplate releasably coupled to the second end of the charge carrier, wherein the second endplate comprises a second set of flexible tube tabs releasably coupled to the second set of tube tab receivers; and wherein the charge carrier is mounted within a gun carrier tube by a set of carrier tabs extending radially outward from an outer surface of the second endplate.

In another aspect of the third embodiment, the perforating gun comprises a charge carrier having a first end and a second end separated by a curved sidewall centered around a longitudinal axis, wherein the charge carrier further comprises a first set of tube tab receivers at the first end and a second set of tube tab receivers at the second end; a first endplate releasably coupled to the first end of the charge carrier, wherein the first endplate comprises a first set of flexible tube tabs releasably coupled to the first set of tube tab receivers; a second endplate releasably coupled to the second end of the charge carrier, wherein the second endplate comprises a second set of flexible tube tabs releasably coupled to the second set of tube tab receivers; and wherein the charge carrier is mounted within a gun carrier tube by a set of carrier tabs extending radially outward from an outer surface of the second endplate; and one or more limitations selected from the following list:

wherein the second endplate further comprises the set of carrier tabs, wherein the gun carrier tube further comprises a carrier tab receiver, and wherein the charge carrier is mounted within the gun carrier tube by mating the carrier tab with the carrier tab receiver;

wherein the carrier tab receiver is an annular recess in the interior surface of the gun carrier;

wherein one or more of the set of carrier tabs includes an alignment pin, wherein the gun carrier tube further comprises an set of alignment pin receivers, and wherein a plurality of shaped charges mounted within the charge carrier are aligned with a corresponding scallop in the gun carrier tube by mating the at least one or more alignment pin with the a corresponding alignment pin receiver in the set of alignment pin receivers;

wherein the first set of tube tab receivers and the second set of tube tab receivers are asymmetrically oriented around the longitudinal axis to correspond with the first set of tube tabs and the second set of tube tabs, respectively;

wherein the first endplate and/or the second endplate comprises a base with a first end separated from a second end separated by a curved sidewall centered around a longitudinal axis; and a set of tube tabs flexibly coupled to the base and extending from the second end, wherein each of the set of tube tabs is generally oriented in a direction of the longitudinal axis, and wherein each of the set of tube tabs comprises a retaining lip;

wherein the first and/or the second endplate further comprises a set of structural supports fixedly coupled to the base and extending from the second end, wherein the set of structural supports is generally oriented in the direction of the longitudinal axis;

wherein the set of structural supports is a plurality of curved sidewalls arranged around an aperture at the second end of the base;

wherein the set of tube tabs are interspersed between the plurality of structural supports;

wherein the plurality of structural supports and the set of tube tabs have substantially equal lengths;

wherein the set of tube tabs and the plurality of structural supports is arranged around an aperture in the second end of the base;

wherein the set of tube tabs comprises at least two tube tabs, and wherein each of the tube tabs is arranged around an aperture in the second end of the base;

wherein the set of tube tabs are asymmetrically disposed around an aperture at the second end of the base;

wherein the first and/or the second endplate further comprises a set of carrier tabs recessed into the curved sidewall, wherein each of the set of carrier tabs comprises a flange projecting radially outward relative to the curved sidewall;

wherein at least one of the set of carrier tabs comprises an alignment pin;

wherein each of the set of carrier tabs is an L-shaped tab;

wherein each of the set of carrier tabs is flexibly coupled to the base to allow the flange to flex relative to the base;

wherein the first and/or the second endplate is integrally formed;

wherein the first and/or the second endplate is formed from plastic, degradable, thermoset, thermoplastic, zinc die cast, steel, composite, magnesium, aluminum, injection mold, and polymer;

wherein a thickness of the base ranges from 0.06-4 inches;

wherein the perforating gun further comprises a zero-tension connector coupled to the second endplate;

wherein the zero-tension connector further comprises a housing with a first end separated from a second end by a sidewall; a sliding contact slidably mounted within a cavity of the housing, wherein the sliding contact has a body with a distal end opposite a proximal end, wherein a portion of the distal end is exposed at the first end of the housing; and a through-wire coupled to the proximal end of the sliding contact;

wherein the through-wire extends out of the housing from the second end;

wherein the zero-tension connector further comprises a spring located within the cavity of the housing, wherein the spring is positioned between the proximal end of the sliding contact and the second end of the housing;

wherein the portion of the distal end of the sliding contact exposed at the first end of the housing is sized to receive a terminal end of a firing switch;

wherein the zero-tension connector further comprises a first ground connection for a gun carrier; a second ground connection for a tandem; and wherein the first ground connection and the second ground connection are both electrically connected to the through-wire;

wherein the zero-tension connector further comprises an annular flange encircling the housing; and wherein the second ground connection is a spring encircling the first end of the housing abutting the annular flange, and wherein the second ground connection extends beyond the first end of the housing;

wherein the first ground connection is an elongated tab mounted to the housing and electrically coupled to the second ground connection;

wherein the zero-tension connector further comprises a groundwire detachably connected to a distal end of the second ground connection; and wherein the zero-tension connector is configured to establish an electrical ground between a perforating gun and a tandem, wherein the electrical ground passes from the zero-tension connector to a retaining nut in the tandem and then to a switch body in the tandem;

In a fourth embodiment, novel aspects of the present disclosure describe a novel method of assembling a perforating gun for use in oil and gas drilling operations. The method comprises the steps: attaching a first endplate to a first end of a charge carrier, wherein the first endplate comprises a first set of tube tabs; attaching a second endplate to a second end of the charge carrier, wherein the second endplate comprises a second set of tube tabs and a set of carrier tabs extending radially outwardly from an outer surface of the second endplate; and sliding the charge carrier into a gun carrier until the set of carrier tabs mates with set of carrier tab receivers on an internal surface of the gun carrier.

In another aspect fourth embodiment, the method comprises the steps attaching a first endplate to a first end of a charge carrier, wherein the first endplate comprises a first set of tube tabs; attaching a second endplate to a second end of the charge carrier, wherein the second endplate comprises a second set of tube tabs and a set of carrier tabs extending radially outwardly from an outer surface of the second endplate; and sliding the charge carrier into a gun carrier until the set of carrier tabs mates with set of carrier tab receivers on an internal surface of the gun carrier; and one or more limitations selected from the following list:

wherein the set of carrier tab receivers is an annular recess;

wherein the method further comprises installing a zero-tension connector into the first endplate;

wherein the step of installing the zero tension connector further comprises: encircling at least a first end of a housing of the zero-tension connector with a second ground connection, wherein the second ground connection extends out beyond the first end of the housing;

wherein the step of installing the zero tension connector further comprises: electrically connecting the second ground connection with an first ground connection; and wrapping a distal end of an first ground connection at least partially around a base of the first endplate;

wherein the step of installing the zero tension connector further comprises: attaching a ground wire to a proximal end of the first ground connection;

wherein the set of carrier tabs further comprises one or more alignment pins, the method further comprising: aligning one or more alignment pins with a corresponding alignment pin receiver positioned on an interior surface of the gun carrier, wherein alignment of the one or more alignment pins with the corresponding alignment pin receiver aligns shaped charges in the charge carrier with a corresponding scallop on an exterior of the gun carrier;

wherein attaching the first endplate further comprises: orienting the first set of tube tabs with a corresponding tube tab receiver in a first end of the charge carrier; and sliding a second end of the first endplate into the first end of the charge carrier until the first set of tube tabs mates with the first set of tube tab receivers;

wherein attaching the second endplate further comprises: orienting the second set of tube tabs with a corresponding tube tab receiver in a second end of the charge carrier; and sliding a second end of the second endplate into the second end of the charge carrier until the second set of tube tabs mates with the second set of tube tab receivers;

wherein the method further comprises establishing an electrical connection between the perforating gun and a tandem by coupling a sliding contact in a zero-tension connector with an output pin in a firing switch of the tandem;

wherein the electrical connection is established in an absence of tension on a through-wire of the zero-tension connector.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. For example, it should be understood that the method steps described herein are exemplary, and upon reading the present disclosure, a skilled person would understand that one or more method steps described herein can be combined, omitted, re-ordered, or substituted.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An endplate comprising:
   a base with a first end separated from a second end by a curved sidewall, which is centered around a longitudinal axis of the base;
   a plurality of tube tabs flexibly coupled to the base and extending from the second end, wherein each of the set of tube tabs is generally oriented in a direction of the longitudinal axis, and wherein each of the set of tube tabs comprises a retaining lip;
   a plurality of structural supports fixedly coupled to the base and extending from the second end, along the set of tube tabs; and
   an alignment pin projecting radially outward from the curved sidewall.

2. The endplate of claim 1, further comprising a plurality of carrier tabs recessed into the curved sidewall.

3. The endplate of claim 2, wherein at least one of the plurality of carrier tabs comprises a flange projecting radially outward relative to the curved sidewall.

4. The endplate of claim 1, wherein the plurality of structural supports is generally oriented in the direction of the longitudinal axis.

5. The endplate of claim 4, wherein the plurality of structural supports comprises a plurality of curved sidewalls arranged around an aperture at the second end of the base.

6. The endplate of claim 4, wherein the plurality of tube tabs is interspersed between the plurality of structural supports.

7. The endplate of claim 6, wherein the plurality of tube tabs and the plurality of structural supports are arranged around an aperture in the second end of the base.

8. The endplate of claim 1, wherein the plurality of tube tabs is asymmetrically disposed around an aperture at the second end of the base.

\* \* \* \* \*